(No Model.)

A. J. HOAG.
TRACTION WHEEL.

No. 273,532. Patented Mar. 6, 1883.

WITNESSES
H. N. Jenkins
W. C. Chaffee

INVENTOR
Andrew J. Hoag
by Alex Mahon
Attorney

UNITED STATES PATENT OFFICE.

ANDREW J. HOAG, OF BATTLE CREEK, MICHIGAN, ASSIGNOR TO NICHOLS, SHEPARD & COMPANY, OF SAME PLACE.

TRACTION-WHEEL.

SPECIFICATION forming part of Letters Patent No. 273,532, dated March 6, 1883.

Application filed January 20, 1883. (No model.)

*To all whom it may concern:*

Be it known that I, ANDREW J. HOAG, of Battle Creek, county of Calhoun, State of Michigan, have invented certain new and useful Improvements in Removable Ribs or Claws for Traction-Wheels, of which the following is a full, clear, and exact description, reference being had to the accompanying drawings, making part of this specification, in which—

Figure 1:
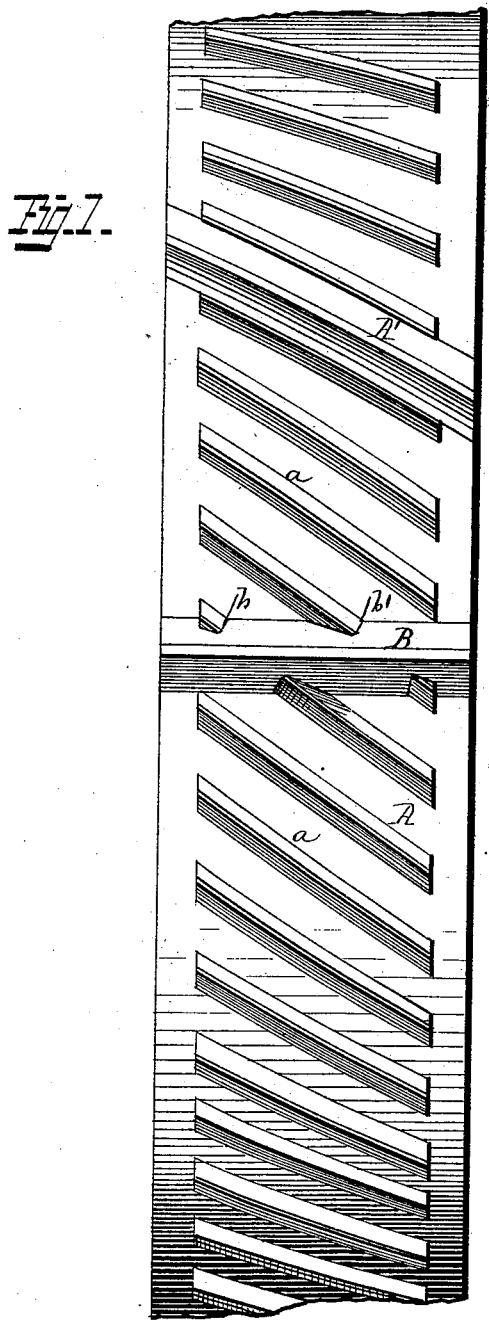
Figure 2:
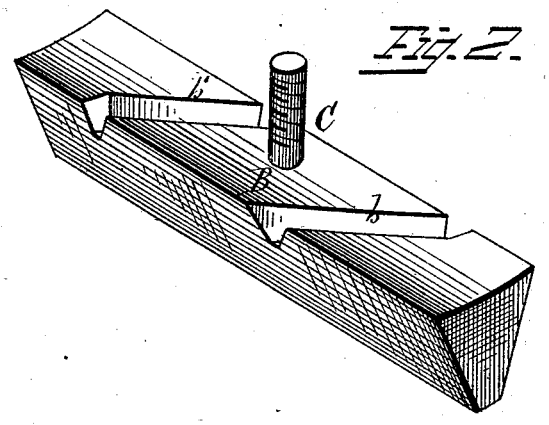
Figure 3:
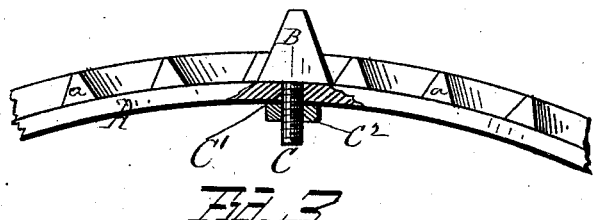

Figure 1 is a face view of a section of an ordinary traction-tire, showing two ways of connecting my improved removable ribs or claws therewith. Fig. 2 is a perspective view of one form of the removable rib or claw from the under side; and Fig. 3 is a side view of a portion of a traction-tire, showing one manner of connecting the rib or claw therewith.

While the traction-wheel tires now in general use have been found to answer nearly all of the requirements, they are yet open to one serious objection. These wheels, as now constructed with a rib or projection sufficient to take hold, so that the power of the engine will suffice to propel itself over the ordinary roads or uphill, have not been found satisfactory where the ground was soft or much cut up, and where a rib of sufficient size was permanently fixed to the tire, and which would hold with enough force on soft or cut ground, it was found too large for the ordinary use or in propelling the engine over the road when the ground was in good condition.

My invention has for its object the remedying of these defects; and it consists in providing the ordinary ribbed traction tire or wheel with removable ribs or claws of sufficient size to insure the wheels from slipping in soft or muddy ground, and which can be easily removed at such times as the permanently-fixed ribs are sufficient to take hold on the ground.

In the accompanying drawings, A represents a portion of an ordinary traction-tire having the ordinary ribs or projections, $a$, extending obliquely across the same, but leaving a smooth surface near each edge, this form having been found the most desirable in practice.

At B is represented the improved detachable rib or claw. The form of this rib or claw is substantially as shown in Fig. 2 of the drawings—that is, made in wedge form and having its inner face curved to fit the tire. In one form of this claw the inner face is provided with grooves or channels $b\ b'$, substantially as shown in Fig. 2. These grooves extend obliquely across the rib or claw, but having the outer wall of each groove cut at an angle corresponding to the outer end of the rib or claw. In this form the rib or claw is shown as extending entirely across and at right angles to the tire, and embracing and covering a portion of two of the permanently-fixed ribs thereof—that is, the opposite end of each rib—the fixed rib fitting within the grooves or channels formed in the removable rib or claw, the angularly-formed ends of the outer walls fitting over the ends of said fixed ribs.

At A', Fig. 1, a modification in the arrangement of the claw in relation to the fixed ribs is shown, in which case the removable claw is shown placed between two of the fixed ribs, and extending obliquely across the tire, in which case the grooves or channels $b\ b'$ are dispensed with. The rib or claw is provided centrally of its length with a projecting screw-bolt, C, adapted to pass through a perforation, C', formed in the tire, and by means of which bolt and a nut, $C^2$, the rib is secured to the tire.

By either of the above-named arrangements it will be seen that the fixed ribs on the tire will hold the removable ribs or claws against the resistance consequent to the forward or backward movement of the wheel, and also serve to relieve the holding-bolt from any strain. In practice I have generally applied about four or five of these ribs or claws to each of the driven wheels; but a greater or less number may be used, according to the circumstances. By providing these ribs with the projecting bolt, and attaching them to the tire by means of the nut, it will be seen that they can be readily removed by hand, as it is only necessary to tighten the nut sufficiently to draw the inner face of the rib or claw in close contact with the tire, as all the strain, as before stated, is brought upon and against the fixed ribs.

The form of the rib shown and the manner of connecting the same to the tire having been found the most convenient in practice, it will yet be seen that the form of the same, and also the manner of connecting the rib or claw to the tire, may be varied without departing from the spirit or intent of my invention.

Having now described my invention, I claim—

1. A detachable rib or claw adapted to have a bearing on the face of the ribbed traction-tire, substantially as and for the purpose described.

2. In combination with a traction-tire provided with permanently-fixed ribs, a removable rib or claw having an unyielding connection with said tire, substantially as and for the purpose described.

3. The detachable rib or claw provided with grooves for adapting the same for use with a grooved or ribbed tire, substantially as and for the purpose described.

4. The detachable rib or claw provided with the bolt or its equivalent for adapting it to be connected with the ribbed traction-tire, substantially as described.

5. The detachable rib or claw having the grooves or channels formed therein, and provided with the bolt or its equivalent, in combination with the ribbed or corrugated tire, substantially as and for the purpose described.

ANDREW J. HOAG.

Witnesses:
FRANK W. DUNNING,
F. T. ROBERTS.